May 26, 1959

F. E. McLANE 2,888,621

ELECTRIC DRIVE

Filed April 9, 1956

United States Patent Office 2,888,621
Patented May 26, 1959

2,888,621
ELECTRIC DRIVE

Fletcher E. McLane, Lancaster, N.Y., assignor to Westinghouse Electric Corporation, East Pittsburgh, Pa., a corporation of Pennsylvania Application April 9, 1956, Serial No. 576,859

7 Claims. (Cl. 318—145)

My invention relates, generally, to electric drives and, more particularly, to electric drives of the variable voltage type.

An object of my invention, generally stated, is to provide an electric drive which shall be simple and efficient in operation and which may be economically manufactured and installed.

A more specific object of my invention is to provide a variable voltage electric drive which is self-regulating and in which a relatively high speed range is obtained by armature voltage control.

Another object of my invention is to provide an electric drive in which the driving motor can be stopped without opening the circuit between the motor and the generator.

A further object of my invention is to provide for jogging the driving motor in both forward and reverse directions without opening the circuit between the motor and the generator.

Still another object of my invention is to provide a counter e.m.f. regulator for regulating the speed of the driving motor of a variable voltage drive.

A still further object of my invention is to provide for reversing the driving motor of a variable voltage drive without utilizing reversing switches or contactors in the armature circuit.

Other objects of my invention will be explained fully hereinafter or will be apparent to those skilled in the art.

In accordance with one embodiment of my invention, the excitation of the direct current generator in a variable voltage drive is controlled by a regulating loop including a field winding of the generator and a reference voltage obtained by means of a rheostat connected across a rectifier energized from the alternating current supply for the motor which drives the generator. Thus, the generator voltage is balanced against the reference voltage which may be adjusted to obtain the desired speed of the direct current motor by controlling the armature voltage. The speed of the motor is held practically constant at varying loads by inserting into the regulating loop a voltage proportional to the armature current. The drive motor may be stopped, without opening the armature circuit, by reducing the reference voltage to zero. Jogging of the drive motor is obtained by inserting a low reference voltage of the proper polarity into the loop circuit.

Figure 1:
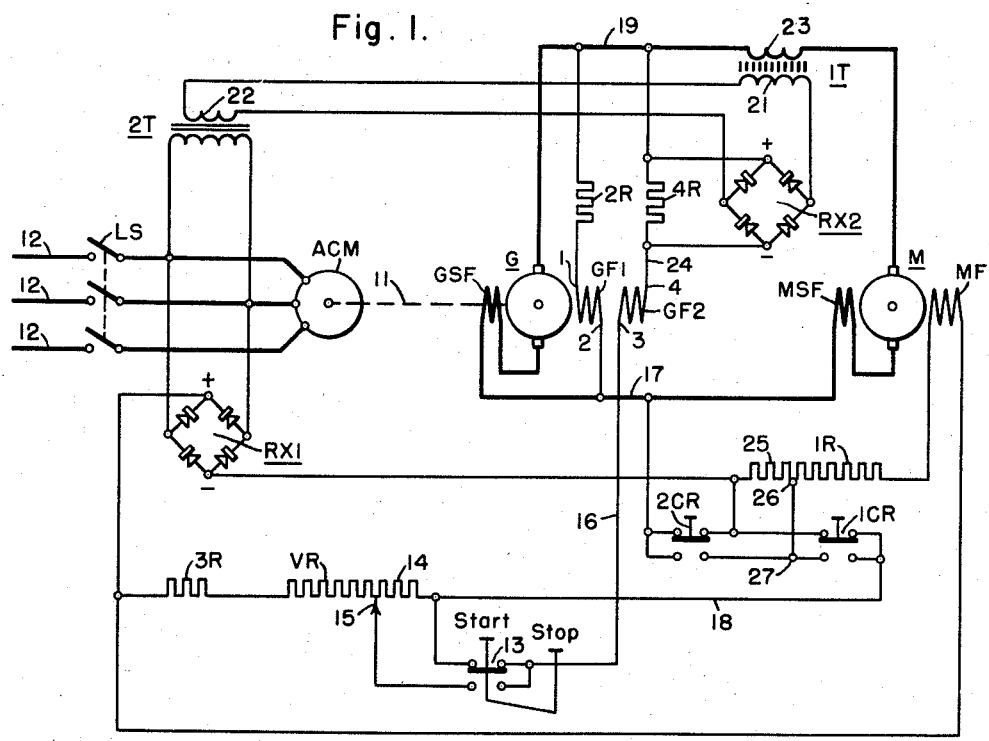
Figure 2:
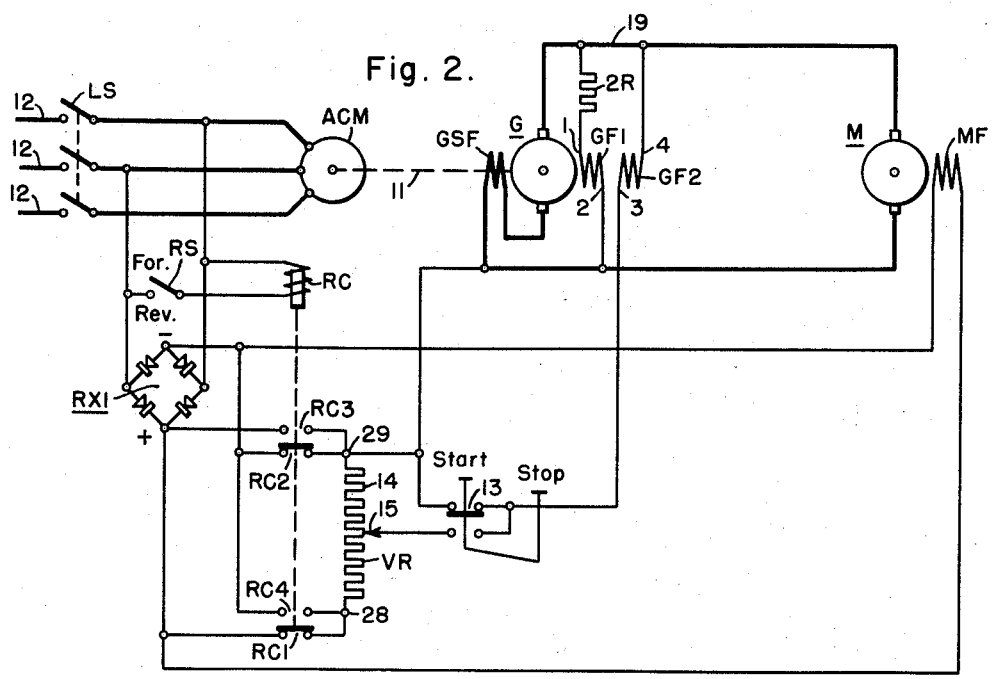

For a better understanding of the nature and objects of the invention, reference may be had to the following detailed description, taken in conjunction with the accompanying drawings in which:

Figure 1 is a diagrammatic view of a variable voltage electric drive embodying the principal features of the invention; and Fig. 2 is a diagrammatic view of a modification of the electric drive shown in Fig. 1.

Referring to the drawings, and particularly to Fig. 1, the electric drive shown therein comprises a direct current generator G, a direct current motor M having its armature winding connected in a closed loop circuit with the armature winding of the generator G, and an alternating current motor ACM which is mechanically connected to the generator G by means of a shaft 11. The terminals of the motor ACM may be connected to alternating current power conductors 12 by means of a line switch LS.

The generator G is provided with a series field winding GSF and a shunt field winding GF1 which is connected across the generator G in series with a resistor 2R. The generator is also provided with a field winding GF2, the excitation of which is controlled in a manner which will be described more fully hereinafter.

The motor M is provided with a series field winding MSF and a field winding MF which is connected across the direct current terminals of a rectifier RX1. A resistor 1R is connected in series with the field winding MF. The alternating current terminals of the rectifier RX1 are connected across one phase of the power conductors 12 when the switch LS is closed to energize the alternating current motor ACM.

A variable resistor or rheostat VR is connected across the direct current terminals of the rectifier RX1 in series with a resistor 3R and a push button switch 1CR. The switch 1CR and another push button switch 2CR are utilized to provide jogging of the motor M, as will be explained more fully hereinafter. A push button switch 13 having a "start" lever and a "stop" lever is provided for controlling the starting and stopping of the motor M without it being necessary to interrupt the closed loop circuit for the armature windings of the motor and the generator.

A transformer 2T has its primary winding connected across one phase of the alternating current power conductors. The secondary winding of the transformer 2T is connected across the alternating current terminals of a rectifier RX2 in series with one winding of a transducer or saturable reactor 1T. The other winding of the reactor 1T is connected in series with the closed loop circuit for the motor and the generator. Thus, the direct current winding of the saturable reactor is energized by the armature current of the motor M. A resistor 4R is connected across the direct current terminals of the rectifier RX2. The resistor 4R is connected in series with the field winding GF2 for a purpose which will be explained more fully hereinafter.

When the switch LS is closed, the motor ACM is energized to drive the generator G at a substantially constant speed. The rectifier RX1 is energized with a substantially constant alternating current voltage. Therefore, the field winding MF of the motor M is energized with a substantially constant direct current voltage. Consequently, the speed of the motor M depends primarily upon the voltage of the generator G which, in turn, depends upon the excitation of the generator.

As previously explained, the variable resistor VR is connected across the direct current terminals of the rectifier RX1 and a constant voltage is applied to the resistor. When the "start" push button is depressed, a portion 14 of the resistor VR is connected in a regulating loop which includes the field winding GF2. Thus, a reference voltage which is determined by the setting of the variable resistor or rheostat VR is impressed on the field winding GF2, thereby causing the generator to generate a voltage. The circuit through the field winding GF2 extends from a terminal 15 on the resistor VR through the push button switch 13, a conductor 16, the field winding GF2 in a direction from terminal 3 to terminal 4, the resistor 4R, conductor 19, the resistor 2R, the field winding GF1 in a direction from terminal 1 to terminal 2, conductor 17, the push button switches 2CR and 1CR, and conductor 18 to the negative terminal of the resistor VR.

The field windings GF2 and GF1 function cumulatively to cause the generator G to produce a predetermined voltage which, as previously explained, depends upon the setting of the rheostat VR. When the reference voltage is higher than the generated voltage, current flows through the field winding GF2 in a direction to increase the generator excitation, thereby raising the generated voltage. When the generated voltage is higher than the reference voltage, current flows through the field winding GF2 in the opposite direction, thereby decreasing the generator excitation and lowering the generated voltage. Thus, a balance is maintained between the reference voltage and the generated voltage, thereby making the system self-regulating so far as the generated voltage is concerned.

In order to make the system self-regulating with respect to the motor speed which normally might vary some with a varying load on the motor M, a counter emf regulator comprising the rectifier RX2, the saturable reactor 1T and the resistor 4R is provided. As previously explained, the alternating current winding 21 of the reactor 1T is connected in series with the secondary winding 22 of the transformer 2T, the primary winding of which is connected across the alternating current conductors 12.

The direct current winding 23 of the reactor 1T is energized by the load current of the motor M. As the load current increases, the saturation of the reactor 1T increases, thereby permitting more current to flow through the windings 21 and 22 which are connected across the rectifier RX2. In this manner, a voltage is developed across the resistor 4R which is substantially proportional to the armature current flowing through the motor M which, in turn, is proportional to the mechanical load on the motor.

The voltage developed across the resistor 4R is inserted in the regulating loop for the field winding GF2 with such polarity as to cancel the component of armature voltage which is proportional to the IR drop in the motor M. Therefore, the voltage across conductors 17 and 24 is equal to the counter emf of the motor. The counter emf is compared with the reference voltage obtained from the variable resistor VR, and the difference between the reference voltage and the counter emf is applied to the control field GF2 of the generator. Therefore, the system regulates the motor counter emf and hence holds the motor speed practically constant as mechanical load is applied or removed.

As previously explained, the motor M may be stopped without interrupting the closed loop circuit for the motor and the generator, and without opening the line switch LS. When the "stop" push button is depressed, the contact members 13 connect the generator field winding GF2 across the generator through the push buttons 1CR and 2CR. Under these conditions, the generated voltage is impressed across the field winding GF2 with a reversed polarity; that is, in the direction 4–3, thereby reducing the generated voltage to substantially zero. Accordingly, the motor M will stop when substantially zero voltage is applied across its armature winding.

If a low positive reference voltage is now applied to the field winding GF2, the motor will jog in a forward direction. If a low negative reference voltage is applied to the field winding GF2, the motor will jog in a reverse direction. A low positive reference voltage may be applied to the field winding GF2 by depressing the push button 1CR, thereby connecting a portion 25 of the resistor 1R in a closed loop with the field winding GF2. The circuit through the field winding extends from a terminal 26 on the resistor 1R, through a conductor 27, the push button 1CR, conductor 18, the push button 13, conductor 16, the field winding GF2, in a direction from 3 to 4, the resistor 4R, conductor 19, resistor 2R, the field winding GF1, conductor 17, and the push button 2CR, to the negative terminal of the resistor 1R.

When the push button 2CR is depressed, the motor will jog in the reverse direction since the excitation of the field windings of the generator is reversed. The circuit through the field windings extends from the terminal 26 through conductor 27, the push button 2CR, conductor 17, the field winding GF1 in a direction 2–1, the resistor 2R, conductor 19, the resistor 4R, the field winding GF2 in a direction 4–3, conductor 16, push button 13, conductor 18, and the push button 1CR, to the negative terminal of the resistor 1R. In this manner, jogging of the motor M in either direction may be obtained.

It will be noted that the field windings GF1 and GF2 normally act cumulatively, thereby reducing the size of the regulating field winding GF2 and the variable resistor VR required for controlling the generator excitation. Furthermore, the system is self-regulating for both voltage and speed and does not require the provision of external regulators.

As shown in Fig. 2, the direction of rotation of the motor M may be reversed without providing reversing contactors in the main motor circuit. In order to reverse the motor M, a reversing contactor RC is provided for reversing the polarity of the reference voltage applied to the generator field, and a reversing switch RS is provided for controlling the operation of the contactor RC.

As shown in the drawing, when the switch RS is open or in the forward position, the coil of the contactor RC is deenergized and the contact members of the contactor are in the position shown in the drawing. When the contactor RC is in the position shown, the terminal 28 of the resistor VR is connected to the positive terminal of the rectifier RX1 through contact members RC1 of the contactor RC. The terminal 29 of the resistor VR is connected to the negative terminal of the rectifier RX1 through contact members RC2 of the contactor RC.

When the switch RS is closed or in the reverse position to energize the coil of the contactor RC, the terminal 29 of the resistor VR is connected to the positive terminal of the rectifier RX1 through contact members RC3. Likewise, the terminal 28 of the resistor VR is connected to the negative terminal of the rectifier through contact members RC4. Therefore, the polarity of the potential impressed on the resistor VR is reversed and, consequently, the polarity of the potential impressed on the field windings GF2 and GF1 is reversed. Accordingly, the potential of the voltage generated by the generator G is reversed which causes the reversal of the motor M, since the polarity of the excitation of the motor field MF remains the same. In this manner, the reversing contactor may be designed for relatively light duty since it is only required to handle the current flowing through the resistor VR. The regulating features of the system function in the manner previously described.

From the foregoing description, it is apparent that I have provided an electric drive which is simple in structure and requires a relatively small amount of apparatus for controlling the operation of the drive. The drive is self-regulating for voltage and speed. Furthermore, the drive motor may be stopped and reversed without requiring the use of contactors in the main motor circuit. Jogging operation in either direction may also be obtained without opening the main motor circuit. Therefore, the control apparatus required may be of a type suitable for relatively light duty.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In an electric drive, in combination, a direct current generator, a direct current motor having its armature winding connected in a closed loop circuit with the armature winding of the generator, an alternating current motor mechanically connected to the generator and having terminals for connecting to alternating current power conductors, a variable resistor connected across a source of direct current, and a field winding for the direct current generator connected across said closed loop circuit and in series with a portion of said variable resistor, switching means for disconnecting the generator field winding from said variable resistor and connecting said generator field winding directly across said closed loop circuit to stop the direct current motor, a resistor energized with direct current, and additional switching means for inserting the voltage developed across said resistor into the circuit for the generator field winding to cause jogging of the direct current motor in preselected directions.

2. In an electric drive, in combination, a direct current generator, a direct current motor having its armature winding connected in a closed loop circuit with the armature winding of the generator, an alternating current motor mechanically connected to the generator and having terminals for connecting to alternating current power conductors, a rectifier having alternating current terminals for connecting to said power conductors, a variable resistor connected across the direct current terminals of the rectifier, a motor field winding also connected across the direct current terminals of the rectifier, a field winding for the direct current generator connected across said closed loop circuit and in series with a portion of said variable resistor, switching means for disconnecting the generator field winding from said variable resistor and connecting said generator field winding directly across said closed loop circuit to stop the direct current motor, a resistor connected in series with the motor field winding, and additional switching means for inserting the voltage developed across said resistor into the circuit for the generator field winding to cause jogging of the direct current motor in preselected directions.

3. In an electric drive, in combination, a direct current generator, a direct current motor having its armature winding connected in a closed loop circuit with the armature winding of the generator, an alternating current motor mechanically connected to the generator and having terminals for connecting to alternating current power conductors, a rectifier having alternating current terminals for connecting to said power conductors, a variable resistor connected across the direct current terminals of the rectifier, a motor field winding also connected across the direct current terminals of the rectifier, a generator field winding connected across said closed loop circuit and in series with a portion of said variable resistor, and switching means for disconnecting the generator field winding from said variable resistor and connecting said generator field winding directly across said closed loop circuit to stop the direct current motor.

4. In an electric drive, in combination, a direct current generator, a direct current motor having its armature winding connected in a closed loop circuit with the armature winding of the generator, an alternating current motor mechanically connected to the generator and having terminals for connecting to alternating current power conductors, a rectifier having alternating current terminals for connecting to said power conductors, a variable resistor connected across the direct current terminals of the rectifier a motor field winding also connected across the direct current terminals of the rectifier, a generator field winding connected across said closed loop circuit and in series with a portion of said variable resistor, switching means for disconnecting the generator field winding from said variable resistor and connecting said generator field winding directly across said closed loop circuit to stop the direct current motor, a resistor connected in series with the motor field winding, and additional switching means for connecting a portion of said resistor in the circuit for the generator field winding to cause jogging of the direct current motor in preselected directions.

5. In an electric drive, in combination, a direct current generator, a direct current motor having its armature winding connected in a closed loop circuit with the armature winding of the generator, an alternating current motor mechanically connected to the generator and having terminals for connecting to alternating current power conductors, a rectifier having alternating current terminals for connecting to said power conductors, a variable resistor connected across the direct current terminals of the rectifier, a motor field winding also connected across the direct current terminals of the rectifier, a generator field winding connected across said closed loop circuit and in series with a portion of said variable resistor, another resistor connected in series with the generator field winding, means for developing a voltage across said other resistor substantially proportional to the armature current in the direct current motor, switching means for disconnecting the generator field winding from said variable resistor and connecting said generator field winding directly across said closed loop circuit to stop the direct current motor, a third resistor connected in series with the motor field winding, and additional switching means for inserting the voltage developed across said third resistor into the circuit for the generator field winding to cause jogging of the direct current motor in preselected directions.

6. In an electric drive, in combination, a direct current generator, a direct current motor having its armature winding connected in a closed loop circuit with the armature winding of the generator, an alternating current motor mechanically connected to the generator and having terminals for connecting to alternating current power conductors, a rectifier having alternating current terminals for connecting to said power conductors, a variable resistor connected across the direct current terminals of the rectifier, a motor field winding also connected across the direct current terminals of the rectifier, a generator field winding connected across said closed loop circuit and in series with a portion of said variable resistor, another resistor connected in series with the generator field winding, a second rectifier having its direct current terminals connected across said other resistor, means for energizing said second rectifier in accordance with the armature current in the direct current motor, switching means for disconnecting the generator field winding from said variable resistor and connecting said generator field winding directly across said closed loop circuit to stop the direct current motor, a third resistor connected in series with the motor field winding, and additional switching means for inserting the voltage developed across said third resistor into the circuit for the generator field winding to cause jogging of the direct current motor in preselected directions.

7. In an electric drive, in combination, a direct current generator, a direct current motor having its armature winding connected in a closed loop circuit with the armature winding of the generator, an alternating current motor mechanically connected to the generator and having terminals for connecting to alternating current power conductors, a rectifier having alternating current terminals for connecting to said power conductors, a variable resistor connected across the direct current terminals of the rectifier, a motor field winding also connected across the direct current terminals of the rectifier, a generator field winding connected across said closed loop circuit and in series with a portion of said variable resistor, switching means for disconnecting the generator field winding from said variable resistor and connecting said generator field winding directly across said closed loop circuit to stop the direct current motor, a resistor energized by said rectifier to develop a voltage across the resistor, and additional switching means for inserting said voltage into the circuit for the generator field winding to cause jogging of the direct current motor in preselected directions.

References Cited in the file of this patent

UNITED STATES PATENTS

| | | |
|---|---|---|
| 2,389,367 | King | Nov. 20, 1945 |
| 2,411,378 | King | Nov. 19, 1946 |
| 2,519,370 | Herchenroeder | Aug. 22, 1950 |
| 2,747,148 | Peeples | May 22, 1956 |

FOREIGN PATENTS

| | | |
|---|---|---|
| 706,414 | Great Britain | Mar. 31, 1954 |